(12) United States Patent
Shouno

(10) Patent No.: US 8,390,842 B2
(45) Date of Patent: Mar. 5, 2013

(54) PORT MONITOR APPARATUS, METHOD, AND PROGRAM FOR PERFORMING PRINTING RESTRICTION BY MONITORING PRINTER DRIVER

(75) Inventor: Hiroki Shouno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1088 days.

(21) Appl. No.: 11/753,350

(22) Filed: May 24, 2007

(65) Prior Publication Data

US 2007/0279671 A1    Dec. 6, 2007

(30) Foreign Application Priority Data

Jun. 6, 2006   (JP) .................................. 2006-157727

(51) Int. Cl.
  *G06F 3/12*   (2006.01)
  *G06K 15/00*   (2006.01)
(52) U.S. Cl. ....................... 358/1.15; 358/1.14; 358/1.16
(58) Field of Classification Search .................... None
  See application file for complete search history.

(56) References Cited

U.S. PATENT DOCUMENTS

| 2004/0017580 A1* | 1/2004 | Kuroda | 358/1.13 |
| 2004/0109568 A1* | 6/2004 | Slick et al. | 380/277 |
| 2006/0064753 A1* | 3/2006 | Otake et al. | 726/19 |
| 2006/0077420 A1* | 4/2006 | Okamoto et al. | 358/1.14 |
| 2006/0177255 A1* | 8/2006 | Mizoi | 400/62 |
| 2006/0256370 A1* | 11/2006 | Murakawa | 358/1.15 |

FOREIGN PATENT DOCUMENTS

| JP | 11-134136 A | 5/1999 |
| JP | 2006-053658 A | 2/2006 |

* cited by examiner

*Primary Examiner* — Fan Zhang
(74) *Attorney, Agent, or Firm* — Canon USA, Inc., IP Division

(57) ABSTRACT

A port monitor program to transmit data about a print job generated by a printer driver to an image forming apparatus includes reading the data about the print job that is generated by the printer driver and spooled by a spooler; determining whether an authentication process associated with restriction of printing is to be performed for the readout data about the print job; submitting an authentication request to an external server over a network to acquire functional restriction information used for the restriction of printing from the server if it is determined that the authentication process is to be performed; and determining how the print job is restricted on the basis of the functional restriction information acquired from the server.

8 Claims, 10 Drawing Sheets

| 801 | 802 |
|---|---|
| 1 | 0x01 |
| 2 | 0xAA |
| 3 | 0x03 (or) 0x04 |
| 4 | ARBITRARY |
| ⋮ | ⋮ |
| 9-16 | DATA SIZE OF PRINT JOB (BYTE) |
| ⋮ | ⋮ |
| 19 | ARBITRARY |

FIG. 9

```
<?xmlversion="1.0" encoding="UTF-8"?>
<ACT xmlns:xsi="http://www.w3.org/2001/XMLSchema-instance">
    <Version>0</Version>
    <UserInfo>                                                    ┐
        <UserName>Taro</UserName>                                  │
        <BaseRole>PowerUser</BaseRole>                             ├ 1101
        <UserEmail>taro@xxx.yyy</UserEmail>                        │
    </UserInfo>                                                    ┘
    <DeviceInfo>
        <PrintSecurityLevel>0</PrintSecurityLevel>
    </DeviceInfo>
    <DeviceAccessControl>
        <AttributeCategory Name="DeviceCapabilityRestriction" CategoryStatus="static">   ┐
            <saml:AttributeStatement>                                                    │
                <saml:Attribute Name="PdlPrint">                                         │
                    <saml:AttributeValue Name="PdlPrintFlag">Permit</saml:AttributeValue>│
                    <saml:AttributeValue Name="ColorPrint">Color</saml:AttributeValue>   ├ 1102
                    <saml:AttributeValue Name="Simplex">Deny</saml:AttributeValue>       │
                    <saml:AttributeValue Name="Nin1">2</saml:AttributeValue>             │
                </saml:Attribute>                                                        │
            </saml:AttributeStatement>                                                   │
        </AttributeCategory>                                                             ┘
    </DeviceAccessControl>
</ACT>
```

FIG. 10

```
@PJL JOB NAME="12345678_LTR.pdf"
@PJL COMMENT CANPJL SET
CLIENTID="898687e839904818a917a0d9816ef36910000017000000007A-
2005-P01254 A-2005-P01254"
@PJL COMMENT CANPJL SET USERNAME="Suzuki"
@PJL COMMENT CANPJL SET INTERLEAVE=GENERICOFF
@PJL COMMENT CANPJL SET DEVICE=PRINTER
@PJL COMMENT CANPJL SET PAGEORDER=GENERICOFF
@PJL COMMENT CANPJL SET TONERREDUCTION=GENERICOFF
@PJL SET DUPLEX=OFF
@PJL COMMENT CANPJL SET SORTERMODE=GENERICON
@PJL COMMENT CANPJL SET NUPHINT=1
@PJL COMMENT CANPJL SET SECRETTYPE=NONE
@PJL COMMENT CANPJL SET COMPOSITEMODE=GENERICOFF
@PJL COMMENT CANPJL SET TRIMMING=GENERICOFF
@PJL COMMENT CANPJL SET BOOKLET=GENERICOFF
@PJL COMMENT CANPJL SET STAPLE=GENERICOFF
@PJL COMMENT CANPJL SET CHAPTERSTART=GENERICOFF
@PJL COMMENT CANPJL SET SUBSETSTAPLING=GENERICOFF
@PJL COMMENT CANPJL SET PRINTFACE=GENERICOFF
@PJL COMMENT CANPJL SET SHIFTNUMBER=1
@PJL COMMENT CANPJL SET PUNCH=GENERICOFF
@PJL COMMENT CANPJL SET DOCNAME="12345678_LTR.pdf"
@PJL COMMENT CANPJL SET SLIPSHEET=GENERICOFF
@PJL COMMENT CANPJL SET IMAGESHIFT=0
@PJL COMMENT CANPJL SET OUTPUTBIN=AUTO
@PJL SET RESOLUTION=600
@PJL SET COPIES=1
@PJL COMMENT CANPJL SET INSERTIONMODE=PRINTFRONT
@PJL COMMENT CANPJL SET INSERTIONSOURCE=TRAY4
@PJL COMMENT CANPJL SET INSERTIONTYPE=TABSTOCK
@PJL COMMENT CANPJL SET INSERTIONPOSITIONS=3
    :
    :
    :
```

```
%!PS-Adobe-3.0
%%Title:XxxxxxxXxxx-Document1
%%Creator:AdobePS5.dll Version5.1.2
%%CreationDate:11/21/2001 9:56:31
%%BoundingBox: (atend)
%%Pages: (atend)
%%Orientation:Portrait
%%PageOrder:Special
%%DocumentNeededResources: (atend)
%%DocumentSuppliedResources: (atend)
%%DocumentData:Clean7Bit
%%TargetDevice: (ColorPASS-Z600) (3011.103)1
%%LanguageLevel:3
   :
   :
```

PORT MONITOR APPARATUS, METHOD, AND PROGRAM FOR PERFORMING PRINTING RESTRICTION BY MONITORING PRINTER DRIVER

BACKGROUND OF THE INVENTION

1. Field of the Invention

The present invention relates to data processing in a port monitor program used for transmitting a print job that is generated to an image forming apparatus.

2. Description of the Related Art

Increases in the number of printer functions in office devices including multifunction peripherals and laser beam printers have been taken place in recent years. Basic print functions, such as a color printing function and a duplex printing function, have been generalized and the qualities of the basic print functions have been increasingly improved. At the same time, the office devices have been provided with various value-added print functions.

The value-added print functions include a function, called "Nin1", of printing multiple pages on one side of a sheet of paper and a staple function of binding multiple printed sheets of paper with a staple. Availability of such functions in the multifunction peripherals and the laser beam printers allows users to represent various images on printed sheets of paper.

Concurrently with the increases in the number of the printer functions in the office devices including multifunction peripherals and laser beam printers, there are demands for management of printed sheets of paper with the object of the cost and the environmental aspect on the introduction of the office devices. A typical request is that the maximum number of sheets of paper be restricted for every user because the costs of consumed sheets of paper and toner are increased with the increasing number of printed sheets of paper.

Some resolutions have been already proposed against the above problems. For example, Japanese Patent Laid-Open No. 11-134136 discloses a method of managing each user with his/her ID to restrict the available function, resource, and time for every ID.

The method disclosed in Japanese Patent Laid-Open No. 11-134136 is realized in printers and function management systems, such as a function management apparatus and a user management server, which are connected over networks. If a user of a host computer, which is a print client, instructs printing, the printer driver in the print client transmits information concerning the user of the print client to the function management system. The printer driver acquires information concerning available functions associated with the user from the function management system to determine whether print settings meeting the functions are input by the user. Printing is enabled only if the function management system determines that the print settings meeting the functions are input.

In another resolution against the above problems, a print client transmits information concerning an issuer (the user of the print client) of a print job to a printer that inquires of a function management system about the information concerning available functions to determine whether the printing is enabled on the basis of the result of the inquiry. In this case, there is a problem in a reduction in the convenience because the printer can determine whether the printing is enabled only after the printer has received the print job.

In the method disclosed in the Japanese Patent Laid-Open No. 11-134136, the printer driver inquires of the function management system about the information concerning the available functions and performs processing corresponding to the result of the inquiry. Accordingly, if the printer driver does not have the inquiring and processing function, there is a problem in that it is not possible to manage the available functions.

SUMMARY OF THE INVENTION

The present invention provides a mechanism capable of restricting printing of print jobs for every user even if a printer driver that does not support the restriction of the printing in an image forming apparatus is used.

According to an aspect of the present invention, a port monitor program is provided which includes computer-executable instructions for transmitting data about a print job generated by a printer driver to an image forming apparatus. The program includes computer-executable instructions for reading the data about the print job that is generated by the printer driver and spooled by a spooler; computer-executable instructions for determining whether an authentication process associated with restriction of printing is to be performed for the readout data about the print job; computer-executable instructions for submitting an authentication request to an external server over a network to acquire functional restriction information used for the restriction of printing from the server if it is determined that the authentication process is to be performed; and computer-executable instructions for determining how the print job is restricted on the basis of the functional restriction information acquired from the server.

According to another aspect of the present invention, a data processing method is provided using a port monitor program in an information processing apparatus, which transmits data about a print job generated by a printer driver to an image forming apparatus. The method includes reading the data about the print job that is generated by the printer driver and spooled by a spooler; determining whether an authentication process associated with restriction of printing is to be performed for the readout data about the print job; submitting an authentication request to an external server over a network to acquire functional restriction information used for the restriction of printing from the server if it is determined that the authentication process is to be performed; and determining how the print job is restricted on the basis of the functional restriction information acquired from the server.

According to another aspect of the present invention, an information processing apparatus is provided which includes a printer driver; a port monitor used to transmit data about a print job generated by the printer driver to an image forming apparatus; a spooler; a reading unit configured to read the data about the print job that is generated by the printer driver and spooled by the spooler; a first determining unit configured to determine whether an authentication process associated with restriction of printing is to be performed for the readout data about the print job; an acquiring unit configured to submit an authentication request to an external server over a network to acquire functional restriction information used for the restriction of printing from the server if the first determining unit determines that the authentication process is to be performed; and a second determining unit configured to determine how the print job is restricted on the basis of the functional restriction information acquired from the server.

According to another aspect of the present invention, a computer-readable storage medium including computer-executable instructions for port monitoring and for transmitting data about a print job generated by a printer driver to an image forming apparatus. The medium includes computer-executable instructions for reading the data about the print job that is generated by the printer driver and spooled by a spooler; computer-executable instructions for determining whether an authentication process associated with restriction of printing is to be performed for the readout data about the print job; computer-executable instructions for submitting an authentication request to an external server over a network to acquire functional restriction information used for the restriction of printing from the server if it is determined that the authentication process is to be performed; and computer-executable instructions for determining how the print job is restricted on the basis of the functional restriction information acquired from the server.

Further features and aspects of the present invention will become apparent from the following description of exemplary embodiments with reference to the attached drawings.

BRIEF DESCRIPTION OF THE DRAWINGS

FIG. 9 shows an example of a response to an inquiry of a print right acquired by the port monitor in FIG. 5, that is, an example of print right information.

FIG. 10 shows an example of a print attribute information section included in a print job analyzed by the port monitor in FIG. 5.

DESCRIPTION OF THE EMBODIMENTS

Embodiments, features and aspects of the present invention will now herein be described with reference to the attached drawings.

First Exemplary Embodiment

Restriction of printing by a port monitor according to a first embodiment of the present invention will now be described with reference to the attached drawings. The restriction of printing means that each print attribute is enabled or disabled for each user.

The print attributes indicate settings or functions, such as color/monochrome printing, the number of copies, duplex/single-sided printing, finishing settings including staple settings, copy, and facsimile, in a printing apparatus.

The enablement or disablement set for a certain function is sometimes called a print right of the function, and information concerning the print right is sometimes called print right information.

An example configuration in which a controlling apparatus operates, according to the first embodiment of the present invention, will be described with reference to FIG. 1.

Figure 1:
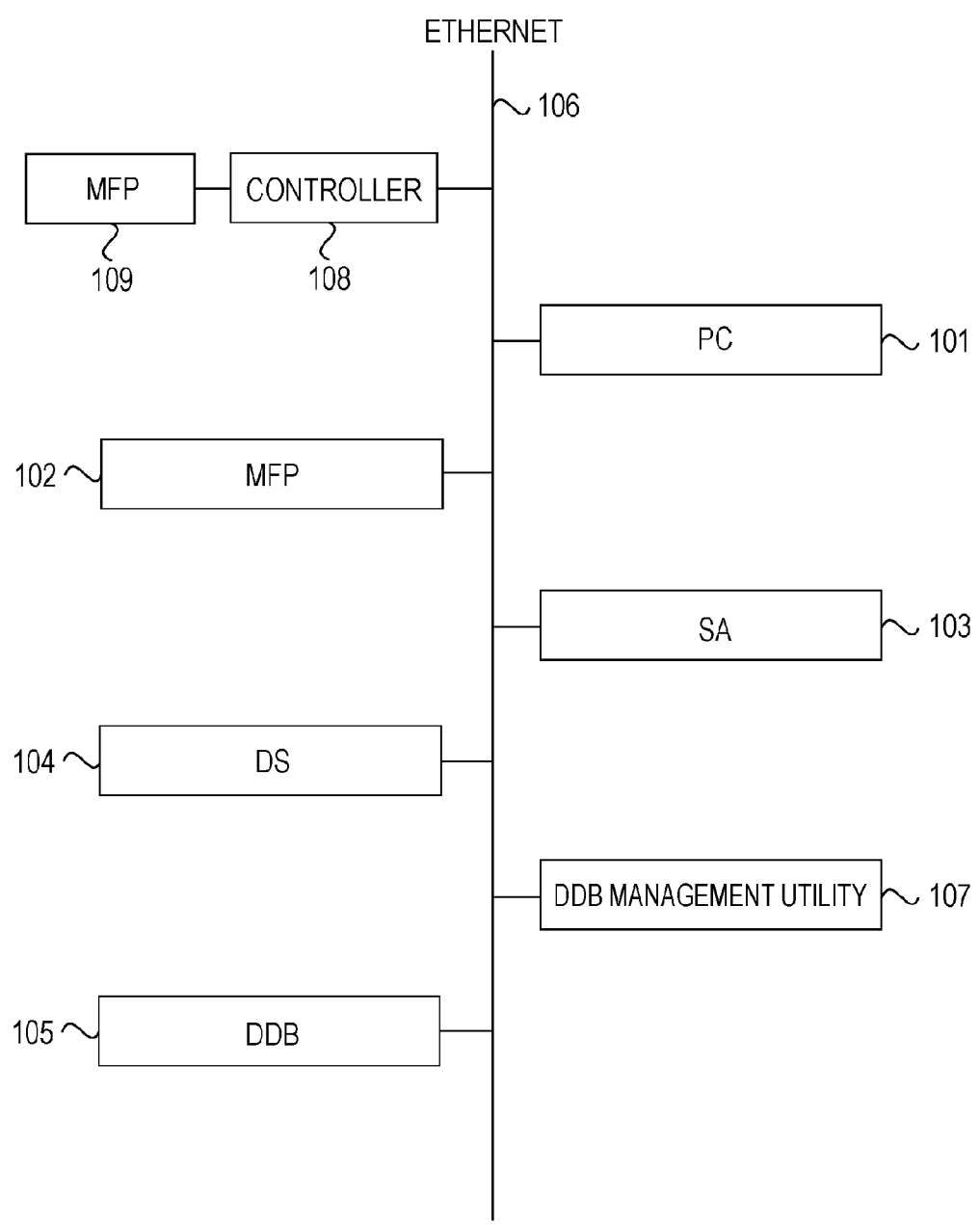
FIG. 1 is a block diagram showing an example of the network configuration of a printing system including an information processing apparatus according to a first embodiment of the present invention.

FIG. 1 is a block diagram showing an example of the network configuration of a printing system including an information processing apparatus according to the first embodiment of the present invention.

A network 106 in a user environment is Ethernet to which nodes having multiple network interfaces described below are connected.

A personal computer (PC) 101 includes a central processing unit (CPU), a read only memory (ROM), and a random access memory (RAM) as main hardware components.

The PC 101 also includes a hard disk drive (HDD), a compact disc-read only memory (CD-ROM) drive, and a CD-ROM functioning as external storage units. The PC 101 further includes a network interface card (NIC) functioning as a communication control unit.

The PC 101 further includes a universal serial bus (USB) interface functioning as a data communication interface and a bus via which these components and peripheral devices described below are controlled.

The peripheral devices connected to the PC 101 includes a mouse, a cathode ray tube (CRT) display, and a keyboard. An operating system (OS) having graphical user interfaces (GUIs) and office software including a word processor and a spreadsheet are installed in the PC 101.

The PC 101 further includes a port monitor transmitting print data that is generated by a printer driver and spooled by a spooler to a printer or a multifunction peripheral (MFP) over the network 106.

The port monitor according to the first embodiment of the present invention means a highly functional communication module provided with a function of transmitting and receiving data and a function of restricting printing. The highly functional communication module is hereinafter referred to as the port monitor.

Information concerning settings of the printer driver, a login client used for logging in a network domain described below, the OS, and applications running on the OS is registered in the OS of the PC 101. The OS of the PC 101 has a registry function with which the information registered in the applications can be read out.

An MFP 109 differs from an MFP 102 in that a dedicated image processing controller 108 is connected to the MFP 109. The image processing controller 108 extracts an image included in data about a print job (print job data) to perform image processing. The PC 101 supplies the print job data for the image processing controller 108, generated by the printer driver (for example, a PostScript (PS) printer driver, to the image processing controller 108.

If the PS printer driver does not support the restriction of printing, the print job data that is not subjected to processing for the restriction of printing is output.

Accordingly, the MFP 109 can output the print job in which the print right is not considered to cause a problem. Embodiments of the present invention described below are particularly useful for resolving such a problem. How the embodiments of the present invention are useful will be sequentially described in detail below.

A security agent (SA) 103 is provided between the port monitor in the PC 101 and a directory database, described below, on the communication path. The SA 103 functions as an intermediary for inquiry and response of the print right information concerning each user.

A directory server (DS) 104 functions as a server of managing the names and user groups (domains) of users who use the network 106, such as the Ethernet, and the nodes connected over the network 106 in a directory hierarchy.

According to the first embodiment of the present invention, the names and group names (domains) of the users who use the PC 101 and other nodes are registered in the DS 104 in advance. For example, Active Directory (registered trademark) of Microsoft Corporation is applicable to the DS 104.

A directory database (DDB) 105 is capable of adding specific information to the directory structure of the DS 104. Specific attribute information can be associated with each user in the directory structure managed by the DS 104. For example, addition, deletion, and editing of the attribute information can be performed. A directory database (DDB) management utility 107 adds and deletes data to and from the DDB 105 and edits the data in the DDB 105.

The network 106 is a local area network (LAN), which is Ethernet (registered trademark) and to which the above components are connected. The above components from the PC 101 to the DDB management utility 107 each have an Ethernet interface and can communicate with each other over the network 106.

The configuration of the components shown in FIG. 1 is an example and is not limited to the one shown in FIG. 1. For example, although only the PC 101 is provided in the first embodiment of the present invention, multiple PCs may be provided in the print system. Although the SA 103, the DS 104, and the DDB 105 are separately provided in the example in FIG. 1, the first embodiment of the present invention is not limited to this configuration.

For example, the DS 104 and the DDB 105 may be integrated into one computer. The SA 103, the DS 104, and the DDB 105 may be integrated into one computer. The SA 103, the DS 104, and the DDB 105 may be included in the PC 101.

Figure 2:
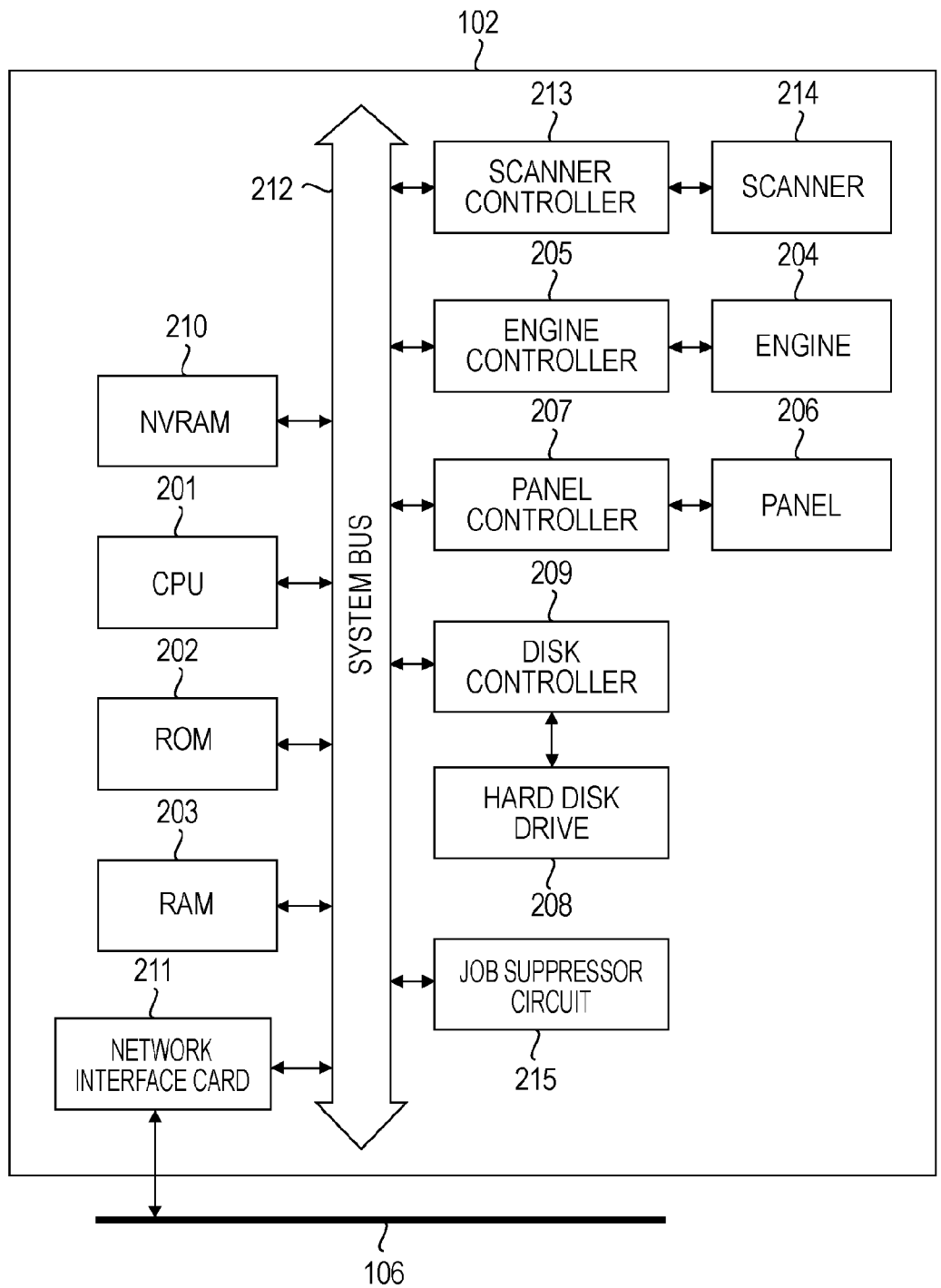
FIG. 2 is a block diagram showing an example of the hardware configuration of an MFP shown in FIG. 1.

The hardware configuration of the MFP 102 will now be described in detail. FIG. 2 is a block diagram showing an example of the hardware configuration of the MFP 102 in FIG. 1. The same reference numerals are used in FIG. 2 to identify the same components in FIG. 1.

In the MFP 102 in FIG. 2, a CPU 201 controls the operation of the entire MFP 102. A read only memory (ROM) 202 stores various programs and a variety of data used by the CPU 201 to control the operation. A random access memory (RAM) 203 functions as a main memory or a working area for the CPU 201. An engine 204 performs print processing.

An engine controller 205 controls driving of the engine 204. A panel 206 is used to receive various operation instructions from a user or to display a variety of information. A panel controller 207 controls input and output of data on the panel 206 and manages the panel 206.

A hard disk drive 208 stores various programs and a variety of data. A disk controller 209 controls access to the hard disk drive 208. A network interface card (NIC) 211 performs network communication with a non-volatile RAM (NVRAM) 210 and the other nodes over the network 106. A scanner controller 213 controls driving of a scanner 214. The components described above are connected to each other over a system bus 212 so as to communicate with each other.

A job suppressor circuit 215 interprets functional restriction information described in a security header and suppresses execution of jobs to cause the MFP 102 to support the security header. Although the job suppressor circuit 215 is hardware in the first embodiment of the present invention, the job suppressor circuit 215 may be software. In this case, the CPU 201 may load a job suppressor module from the ROM 202 or the hard disk into the RAM 203 to execute the loaded job suppressor module. If the MFP 102 does not have a jog suppressing function, that is, if the MFP 102 does not support the interpretation of the security header, the MFP 102 does not include the job suppressor circuit 215.

As described above, multiple pieces of software and data used for controlling each function are stored in the hard disk drive 208. The software or data is read out from the hard disk drive 208, if needed. Typical pieces of software include the OS and multifunction-peripheral control software for controlling the operation of the entire multifunction peripheral.

The multifunction-peripheral control software functions as a print server. Specifically, the multifunction-peripheral control software receives Page Description Language (PDL) data from a node on the network 106. The multifunction-peripheral control software, then, performs raster image processing (RIP) to convert the PDL data into bitmap data in order to generate printable data.

The PC 101 is under the directory structure of the DS 104. Accordingly, it is necessary for the user of the PC 101 to log into the PC 101 in order to use the PC 101. The user of the PC 101 invokes a login interface of the PC 101 and inputs a user name and a password and a user group (domain) corresponding to the user name.

The PC 101 indicates information input in the above manner to the DS 104 as user information, and the DS 104 transmits a login permission response to the PC 101 if the input information is valid. Information concerning the user and user group is not necessarily needed as the user information.

For example, only the user name may be indicated as long as the information can be used to identify the user. The user does not necessarily indicate a person and may indicate a certain group or department.

Figure 3:
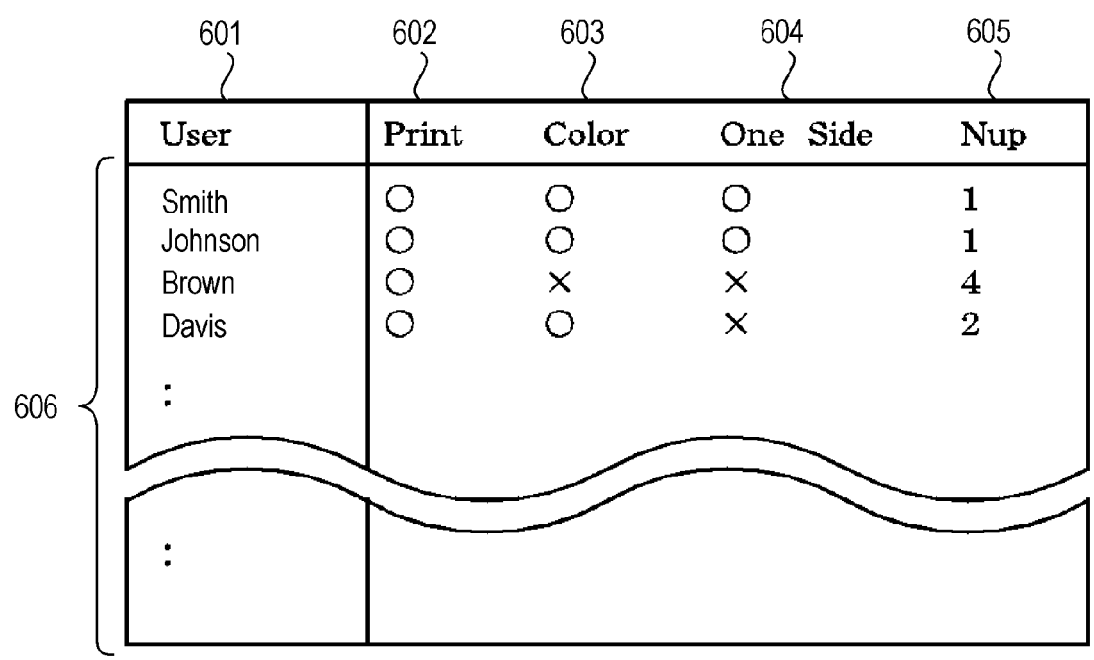
FIG. 3 shows an example of registration information in a DDB shown in FIG. 1.

FIG. 3 shows examples of users managed by the DS 104 in the directory structure. Referring to FIG. 3, a column 601 includes users managed in directories by the DS 104. The users in the directories are shown in rows 606. In the example shown in FIG. 3, four users including "Smith", "Johnson", "Brown", and "Davis" are registered in the user directory.

The DDB 105 associates additional information from a column 602 to a column 605, described below, with each user in the column 601.

The column 602 shows "Print" attributes indicating whether each user has the print right via the port monitor. In the example shown in FIG. 3, the print right is granted to all the four users.

The column 603 indicates whether each user has a color print right. In the example shown in FIG. 3, the color print right is not granted to the user "Brown".

The column 604 indicates whether each user has a single-sided printing right. In the example shown in FIG. 3, the single-sided printing right is granted only to the users "Smith" and "Johnson".

The column 605 indicates the minimum number of pages that can be printed on one side of a sheet of paper. For the users "Smith" and "Johnson", one or more pages can be printed on one side of a sheet of paper.

For the user "Brown", four or more pages can be printed on one side of a sheet of paper. For the user "Davis", two or more pages can be printed on one side of a sheet of paper.

The DDB management utility 107 is utility software used for editing the DDB 105. The DDB management utility 107 functions as a Web server, which provides a Web page on which the DDB 105 is edited.

The user who edits the DDB 105 invokes Web browser software in his/her host computer and inputs a predetermined uniform resource locator (URL) to access the DDB management utility 107.

The input of the predetermined URL displays the Web page on which the DDB 105 is edited and which is provided by the DDB management utility 107. It is assumed that the Web page has an authentication function and only an authorized user can edit the DDB 105 on the Web page.

The editing of the DDB 105 specifically means update of the rights of the functions granted to each user, shown in the example in FIG. 3.

The rights of the functions for every user are collectively called a role. The role is associated with each user in the DDB 105. The role is divided into a custom role and a basic role. In the custom role, the functions are separately set. In the basic role, access rights to the functions are set in advance.

Lightweight Directory Access Protocol (LDAP) is used as the protocol with which the DDB 105 is managed and which is used between the DS 104, the DDB 105, and the DDB management utility 107. The LDAP can be used to access the DDB 105.

Figure 4:
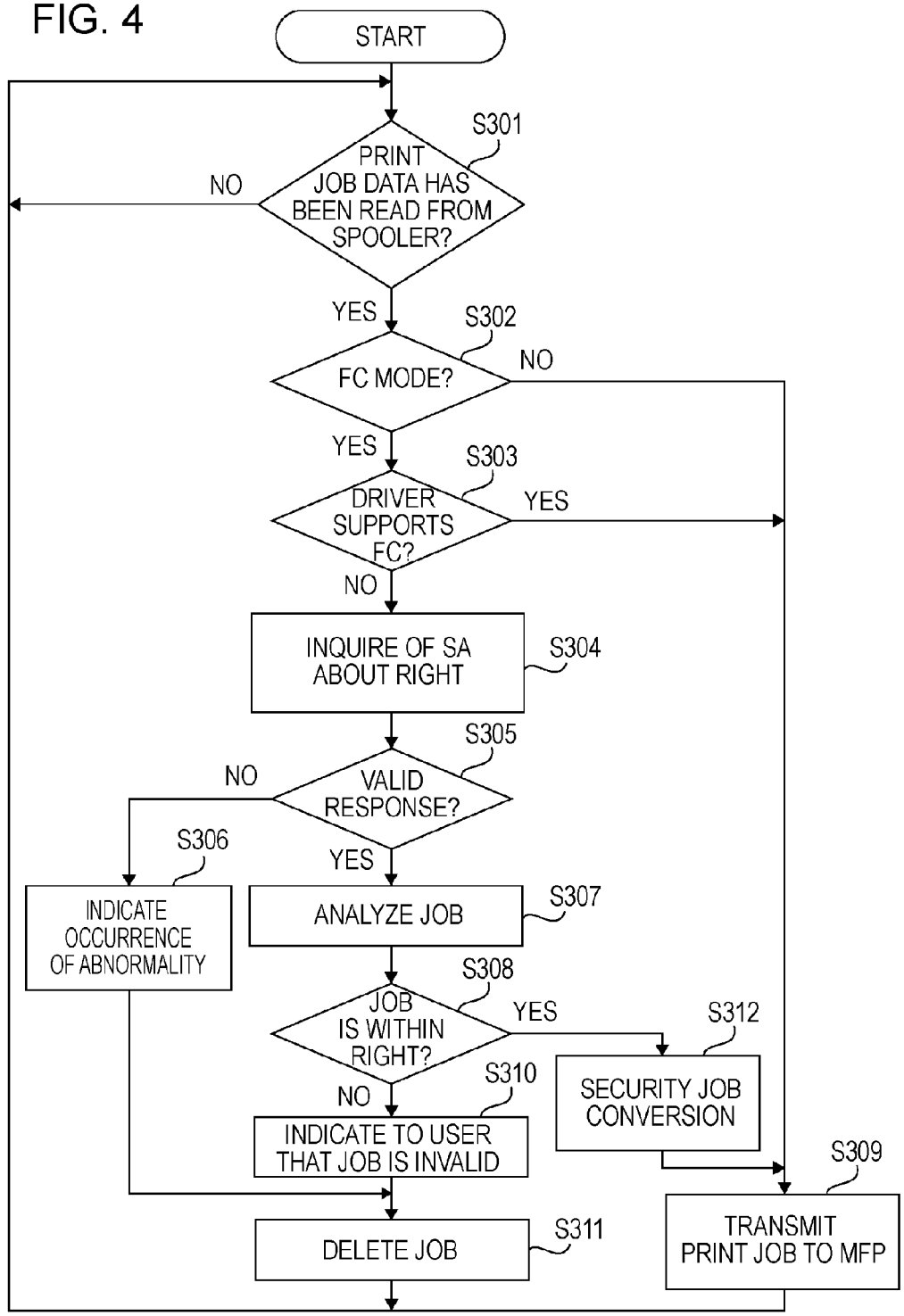
FIG. 4 is a flowchart showing an example of a first data processing process in the information processing apparatus according to the first embodiment of the present invention.

The operational flow of the port monitor according to an embodiment of the present invention will now be described with reference to FIG. 4. FIG. 4 is a flowchart showing an example of a first data processing process in the information processing apparatus according to the first embodiment of the present invention.

Figure 5:
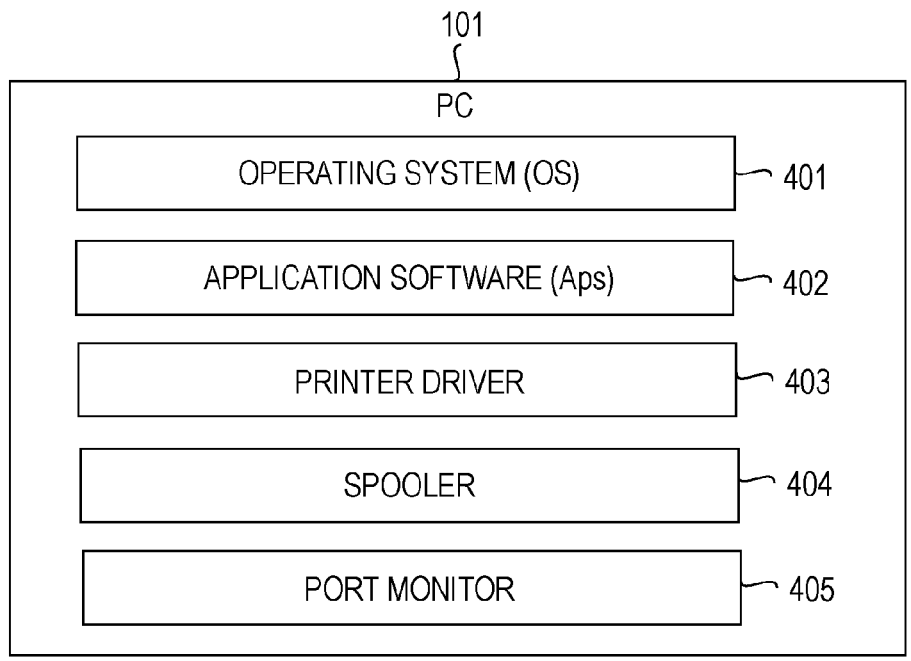
FIG. 5 is a block diagram showing an example of the software module configuration of a PC shown in FIG. 1.

S301 to S311 show steps. It is assumed that a port monitor 405 described below with reference to FIG. 5 is software having a function of transmitting print data to the MFP 102 or the printer and is installed in the PC 101.

In order to register a new printer port in a computer, a port which the OS of the computer is normally provided with may be used or arbitrary port monitor software may be installed to create a dedicated port.

It is assumed in the example shown in FIG. 4 that the port is created in the PC 101 in the latter manner and that data is output to the MFP 102 through the generated port.

The port monitor is loaded in a memory when the OS is invoked. The port monitor resides in the memory after the OS is invoked and is in an idle state and operates in the background.

Referring to FIG. 4, in Step S301, the port monitor 405 in the PC 101 waits for the print job data generated by the printer driver and spooled by the spooler. The port monitor 405 enters the waiting state of the print job data after the invocation.

The print job data is interpreted by a device that prints the print job data. The print job data includes various types of data, such as rendering data in a vector format, rendering data in Extensible Markup Language (XML) format, bitmap data, and additional information indicating a print job language, a job name, a job ID, and a user name.

The print job data may be called a print job or may be called print data, which basically have the same meaning as the print job data.

An operational sequence between the port monitor and other software will be described with reference to FIG. 5.

FIG. 5 is a block diagram showing an example of the software module configuration of the PC 101 shown in FIG. 1. Referring to FIG. 5, an OS 401 operates on the PC 101. Application software (Aps) 402 is arbitrarily installed and invoked by the user. The Aps 402 is, for example, document editing software or a spreadsheet.

If the user instructs printing of data that is being edited by the Aps 402, a printer driver 403 receives a specific unit of data from the Aps 402, sequentially generates a PDL image for every specific unit of data, and passes the generated PDL image to a spooler 404 in the PC 101. The port monitor 405 sequentially receives the print job, which is the PDL image, from the spooler 404.

Figure 6:
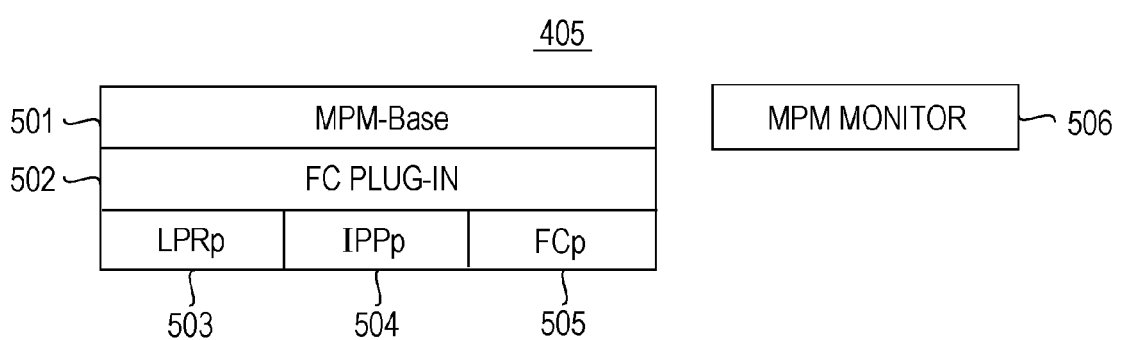
FIG. 6 is a block diagram showing an example of the software module configuration of a port monitor shown in FIG. 5.

A software block in the port monitor 405 will now be described with reference to FIG. 6. FIG. 6 is a block diagram showing an example of the software module configuration of the port monitor 405 shown in FIG. 5.

Referring to FIG. 6, a multi-processing module (MPM)-Base 501 is a basic portion of the port monitor 405. The MPM-Base 501 accepts data from the spooler 404 to invoke a plug-in module corresponding to the type of the port defined by the user. The acceptance of the data from the spooler 404 means reception or reading out of the data.

The MPM-Base 501 invokes an MPM monitor module described below to indicate to the user, for example, the communication state with a device and the data size.

An FC plug-in 502 is a plug-in module performing processing associated with the print right. For example, the FC plug-in 502 inquires of the SA 103 in FIG. 1 about the user right or confirms whether the print attribute of the print job meets the right of the user.

An LPRp 503 is a plug-in module that transmits print data to a device according to Line Printer Daemon (LPR) protocol. Specifically, the LPRp 503 transmits the data received from the spooler 404 to the device according to the LPR protocol.

An IPPp 504 is a plug-in module that transmits print data to a device according to Internet Printing protocol (IPP). Specifically, the IPPp 504 transmits the data received from the spooler 404 to the device according to the IPP.

An FCp 505 is a plug-in module that updates print job data when the PC 101 is in a printing restricted mode (FC mode), described below, in which the printing is restricted.

An MPM monitor 506 is a module that supplies the GUI of the port monitor 405 to the user. The MPM monitor 506 displays the state of a job or device.

The software modules from the MPM-Base 501 to the MPM monitor 506 are called a program module group of the port monitor 405. The program module group is referred to as the port monitor 405 in the embodiments of the present invention.

Referring back to FIG. 4, after the port monitor 405 receives the print job from the spooler 404 in Step S301, then in Step S302, the port monitor 405 determines whether the port monitor 405 operates in the printing restricted mode, which is hereinafter referred to as an FC mode.

The user of the port monitor 405 opens a setup interface via the MPM monitor 506 in the port monitor 405 to enable or disable the FC mode for a specified port.

Figures 7, 8:
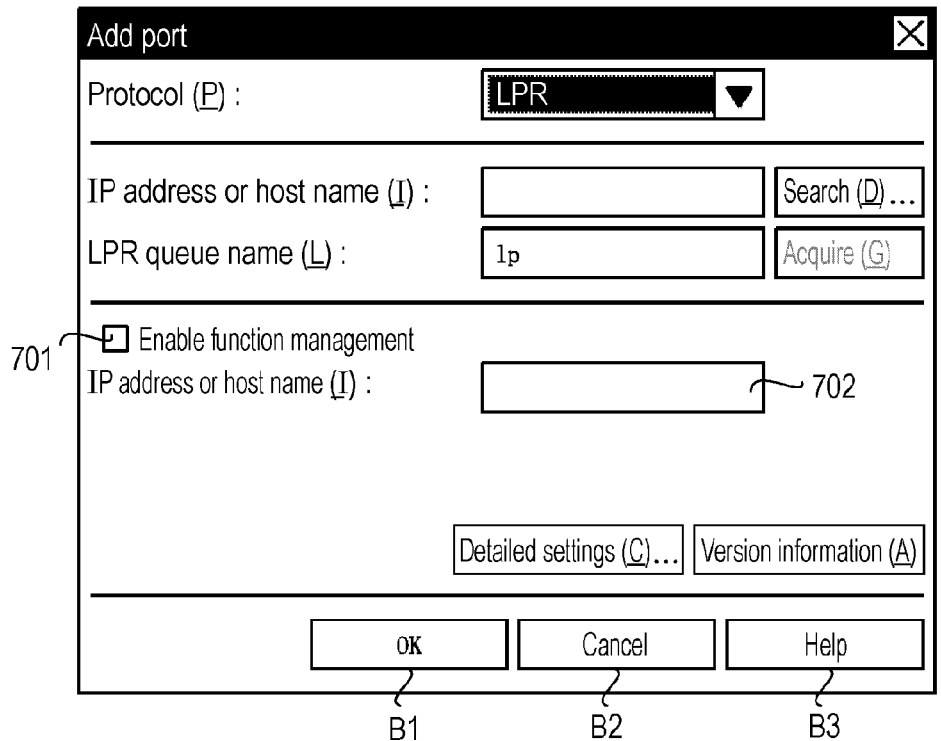
FIG. 7 shows an example of a setup interface of a specified port, generated in the port monitor in FIG. 5.
FIG. 8 shows an example of fixed data in a security header of information added to print data by a printer driver shown in FIG. 5.

FIG. 7 shows an example of the setup interface of a specified port, generated in the port monitor 405 in FIG. 5. A port is to be added in the example of the setup interface provided by the MPM monitor 506. It is assumed that the port through which data is transmitted to the MFP 102 has been set in the PC 101 in advance and that the print job has been received through the set port.

Referring to FIG. 7, if the user checks a check box 701, the port monitor 405 enables the restriction of printing (the process shown in FIG. 4) to transmit the print job to an arbitrary port that is set. As a result, it is possible to enable or disable a function of inquiring the functional restriction information for every user, set for each function which the image forming apparatus, or the MFP, can perform.

If the inquiring function is enabled, it is possible to specify information used for identifying a device of which the functional restriction information for every user, set for each function which the MFP can perform, is inquired.

If the port monitor 405 determines in Step S302 that the port monitor 405 does not operate in the FC mode, that is, if the port monitor 405 determines that the check box 701 is not checked, then in Step S309, the port monitor 405 directly transmits the print job received from the spooler 404 through the specified port.

The function of switching the enablement and disablement of the restriction of printing, performed by the port monitor 405, is provided in consideration of a case where the restriction of printing is not managed depending on the environment in which the port monitor 405 is used.

Referring to FIG. 7, an input form 702 is used to specify an IP address or a domain name service (DNS) host name of the SA 103. If the restriction of printing is enabled, the port monitor 405 inquires of the SA 103 having the IP address or DNS host name input in the input form 702 about the right of the user of the PC 101. The enablement of the restriction of printing means that the check box 701 is checked. Also, the Add port screen may include an "OK" button B1, a Cancel button B2, and a Help button B3.

Referring back to FIG. 4, if the port monitor 405 determines in Step S302 that the port monitor 405 operates in the FC mode, that is, if the port monitor 405 determines that the check box 701 is checked, then in Step S303, the port monitor 405 determines whether the authentication process associated with the restriction of printing is to be performed for the readout print job data.

For example, the port monitor 405 analyzes the print job data to determine whether an inquiry of the restriction of printing is to be performed. Specifically, the port monitor 405 analyzes the header of the print job data to determine whether the printer driver 403 supports the FC mode.

The restriction of printing may be performed by the printer driver 403. In this case, the determination in Step S303 is affirmative and it is not necessary for the port monitor 405 to inquire the right. Accordingly, in Step S309, the port monitor 405 directly transmits the print job received from the spooler 404 through the specified port and goes back to Step S301.

If the port monitor 405 determines in Step S303 that the print job for which the printer driver 403 does not apply the restriction of printing is received from the spooler 404, then in Step S304, the port monitor 405 inquires of the SA 103 about the print right of the user of the PC 101 to restrict the printing.

The determination by the port monitor 405 of whether the printer driver 403 applies the restriction of printing to the print job data, on the basis of whether the security header is included in the print job, will now be described. Specifically, the port monitor 405 determines whether the printer driver 403 supports the restriction of printing.

The "security header" used in the description indicates whether the authentication process associated with the restriction of printing is to be performed for the print job data read out from the spooler 404 by the port monitor 405.

The information indicating whether the authentication process is to be performed is used to determine whether information concerning the print right, as shown in FIG. 9, can be added to the print job. The information is acquired by the printer driver which has generated the print job data and which supports the restriction of printing. The information indicating whether the port monitor 405 should perform the authentication process is exemplified by the security header in the following description.

However, the information indicating whether the port monitor 405 should perform the authentication process may be a flag set at a specified position in the data or a specified digital signature.

The security header is added to the print data by the printer driver when the print data is generated. The security header includes, for example, information used for detecting tampering of the print job. The information used for detecting the tampering of the print job is exemplified by a hash value in the generation of the print job data.

In an environment in which the restriction of printing is enabled, the port monitor 405 or the printer driver 403 controls the execution of the print job in accordance with the print right of the user. However, the print data can be rewritten through the network to update the print attribute to the one that ignores the print right.

In order to prevent the above update, the printer driver 403 and a device that receives the print job have a function of detecting the tampering of data. Such a device does not perform the printing if the device detects that the received print data has been updated.

The MFP 102 according to the first embodiment of the present invention has the function of detecting the tampering of data. The security header is added to the print job data by the printer driver 403 in order to detect the tampering of the data.

After receiving the print job, the MFP 102 analyzes the security header or data in the print job to check whether the received data is tampered.

Specifically, the port monitor 405 compares the print data received from the spooler 404 with the data specific to the security header to determine whether the security header is added to the received print data.

FIG. 8 shows an example of fixed data in the security header of information added to the print job data by the printer driver 403 shown in FIG. 5. Referring to FIG. 8, addresses with respect to the beginning of data are shown in a column 801 in units of bytes. The corresponding value "0x01" is indicated in the first row of a column 802.

The port monitor 405 in FIG. 5 sequentially compares the received data, from the beginning, with each value of the fixed data shown in FIG. 8. If the data size and all the values of the received data are equal to those in the fixed data in FIG. 8, the port monitor 405 determines that the security header is added to the received data.

If the security header exists, the port monitor 405 determines that the printer driver 403 enables the restriction of printing for the print job data received from the spooler 404.

Accordingly, if the port monitor 405 determines in Step S303 that the security header is added to the print job data received from the spooler 404, it is not necessary for the port monitor 405 to inquire of the SA 103 about the user right of the PC 101 and, therefore, in Step S309, the port monitor 405 directly transmits the print job received from the spooler 404 through the specified port. The port monitor 405, then, goes back to Step S301.

In contrast, if the port monitor 405 determines in Step S303 that the security header is not added to the print job data received from the spooler 404, that is, if the port monitor 405 determines that the authentication process associated with the restriction of printing is required for the print job data received from the spooler 404, then in Step S304, the port monitor 405 inquires of the SA 103 about the print right of the user of the PC 101.

Specifically, the port monitor 405 inquires of the OS of the PC 101 about the user information (the user name and the name of the user group (domain name)) concerning the user who has currently logged in the PC 101. The inquiry is performed by using an application program interface (API) or the registry in the OS.

At this time, the port monitor 405 transmits a packet to request the inquiry of the print right of the user to the IP address or DNS host name input in the input form 702. The protocol used in the inquiry does not have a general or standard format but has a format that is uniquely defined.

However, the information in the packet to request the inquiry of the print right of the user at least includes the ID of the user (for example, the name of the user or user group (domain)) who has logged in the PC 101 and the ID indicating the inquiry of the print right associated with the user name.

The SA 103 receives the inquiry of the print right of the user and inquires of the DDB 105 about the print right corresponding to the user information specified by the PC 101 according to the specified protocol.

The SA 103 generates print right information, described below with reference to FIG. 9, from the print right determined from the user information and the registration information in FIG. 3 and returns the print right information to the PC 101 over the network 10.

The print right information may be called functional restriction information used for restricting (enabling or disabling) various functions in the printing apparatus. The function of the DDB 105 may be included in the SA 103. In this case, the SA 103 can return the print right information to the PC 101 more quickly.

Referring back to FIG. 4, in Step S305, the port monitor 405 determines whether the SA 103 returns a valid response to the request for the inquiry of the print right of the user from the port monitor 405. If the port monitor 405 determines that the SA 103 returns the valid response, the port monitor 405 stores the response value in the RAM in the PC 101 and goes to Step S307.

When the valid response is returned from the SA 103, the response value includes information indicating the rights associated with the attributes shown in the columns 602 to 605 in FIG. 3.

FIG. 9 shows an example of the response to the inquiry of the print right, which the port monitor 405 in FIG. 5 acquires from the SA 103, that is, an example of the print right information. The data shown in FIG. 9 is generated on the basis of the registration information concerning the users described above with reference to FIG. 3. The data shown in FIG. 9 is included in the data body of the security header shown in FIG. 8. The data shown in FIG. 9 may be included in the data body of a header other than the security header in FIG. 8.

Referring to FIG. 9, the print right information is described according to a specific protocol, as described above. The data in the protocol is described in the XML format, as shown in FIG. 9. The print right information includes a user profile section 1101. The section 1101 includes the user name of the PC 101 and the name of a role associated with the user name. A section 1102 includes an access right (print right). The schema representing the access rights shown in the columns 602 to 605 in FIG. 3 and permission operations corresponding to the access rights are described in the section 1102.

Referring back to FIG. 4, if the port monitor 405 determines in Step S305 that the response value from the SA 103 is invalid or no response is returned from the SA 103, then in Step S306, the port monitor 405 indicates to the user that the acquisition of the print right failed. The port monitor 405 then goes to Step S311.

Specifically, in Step S306, the port monitor 405 displays in a dialog box a message indicating that the printing is stopped because the acquisition of the print right failed to indicate the current status to the user of the PC 101.

In Step S311, the port monitor 405 deletes the print job data and goes back to Step S301. If the port monitor 405 determines in Step S305 that the valid response is returned from the SA 103, then in Step S307, the port monitor 405 reads the print attribute information included in the print job to perform job analyses including comparison of the readout print right information with the result of the inquiry from the SA 103.

The print job data can be divided into a print attribute information section and a print data section. The print attribute information section includes environmental information, such as the name of a user or computer who or which performs the printing, and information specified by the printer driver 403, such as the number of copies, the enablement or disablement of the duplex printing, and specification of a finisher bin.

FIG. 10 shows an example of the print attribute information section included in the print job data analyzed by the port monitor 405 in FIG. 5.

The attributes and the corresponding values are specified in pairs in the print attribute information section.

Referring back to FIG. 4, in Step S308, the port monitor 405 compares the print right of the user who requests the printing of the print job data, acquired from the SA 103, with the values of the print attributes included in the print job data to determine whether the set print attributes meet the print right of the user.

The number of pages on one side of a sheet of paper, shown in the column 605 in FIG. 3, is exemplified. The port monitor 405 reads and interprets the following description in the section 1102 in FIG. 9. In the example shown in FIG. 9, the schema shows that the number of pages on one side of a sheet of paper is set to "2" (two pages).

<sam1:AttributeValue
Name="Nin1">2</sam1:AttributeValue>

Specifically, the minimum number of pages on one side of a sheet of paper, set for the user, is two.

The port monitor 405 analyzes the following description indicating the number of pages on one side of a sheet of paper, in the print attribute information section.

@PJL COMMENT CANPJL SET NUPHINT=1

In the above command, the user sets the number of pages printed on one side of a sheet of paper to one. However, since the number of pages printed on one side of a sheet of paper is set to two in the print right of the user received from the SA 103, the port monitor 405 determines that the user does not have the right of printing only one page on one side of a sheet of paper.

As described above, even if the printer driver does not support the print right, the port monitor 405 compares the print right of the user who requests the printing with the print attribute in the received print job on the basis of the restriction of printing. Accordingly, the port monitor 405 can detect the print job having the print settings exceeding the print right of the user.

In Step S308, the port monitor 405 performs the above determination for the entire schema of the print right received from the SA 103. If the port monitor 405 determines that any of the attributes specified in the print job does not meet the print right of the user, the port monitor 405 goes to Step S310 without transmitting the print job received from the spooler 404.

In Step S310, the port monitor 405 performs a warning process. Specifically, the port monitor 405 indicates to the user that the print job is invalid and the transmission is stopped in a dialog box shown in FIG. 11 and goes to Step S311.

If the port monitor 405 determines in Step S308 that all the attributes specified in the print job data meet the print right of the user, the port monitor 405 goes to Step S312.

The print attributes specified by the user do not meet the print right of the user in Step S310. Accordingly, the port monitor 405 displays, for example, the dialog box shown in FIG. 11 in the display device of the PC 101 via the MPM monitor 506 to indicate to the user that the printing is stopped.

The port monitor 405 detects disagreement of the print right of the user with the print attributes set in the print job data, transmits the print right to the SA 103, and stores the transmitted print right in the storage device. A user having the right exceeding the print right stored in the storage device and the settings for the user may be tracked by the right of a manager.

Figures 11, 12:
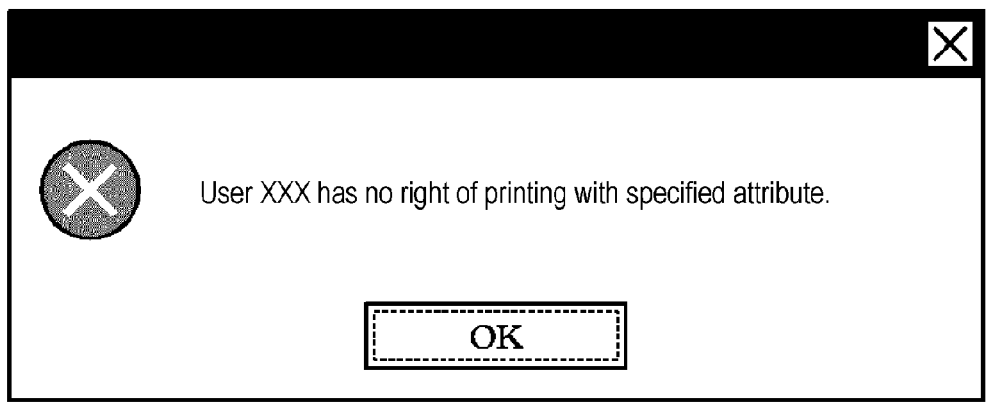
FIG. 11 shows an example of a dialog box displayed in the display device of the PC in FIG. 1.
FIG. 12 shows an example of the initial data of a print job generated by a printer driver of an information processing apparatus according to a second embodiment of the present invention.

FIG. 11 shows an example of a dialog box displayed in the display device of the PC 101 in FIG. 1. The dialog box is displayed via the MPM monitor 506 in the port monitor 405. In the example shown in FIG. 11, a user XXX indicates that the name (login name) of the user who currently logs in the PC 101 is "XXX".

Referring back to FIG. 4, in Step S311, the port monitor 405 deletes the print job. Indication that the print job is deleted to the user using the display device allows the user to efficiently perform the printing again.

Specifically, the port monitor 405 deletes the print job determined in Step S308 to be generated by the user who has no print right from the spooler 404 and the memory space managed by the port monitor 405 and goes back to Step S301.

In contrast, if the port monitor 405 determines in Step S308 that all the attributes specified in the print job meet the print right of the user, the port monitor 405 goes to Step S312 to convert the print job into a security job.

In the conversion into the security job according to the first embodiment of the present invention, the port monitor 405 performs the following process to the print job received in Step S301. The port monitor 405 performs specified data conversion and data attachment to the print job in order to allow the MFP 102 to detect the tampering of the data.

For example, the port monitor 405 encodes the print job data to convert the print job data into a security job. As a result, the print job is converted into the security job and the MFP 102 can detect any tampering of the print job data that is received.

In Step S309, the port monitor 405 transmits the print job to the MFP 102 and goes back to Step S301. For example, the port monitor 405 transmits the print job to a predetermined target by a predetermined transmission method.

The transmission method means a protocol, such as the LPR or the IPP, or detailed setting information about each protocol. The setting information indicates a print queue, a print port, the number of times of retransmission, and the packet data size.

The target means information about a destination defined in each protocol. The information indicates an IP address or a DNS host name in the case of the LPR and indicates URL information concerning the target in the case of the IPP.

According to the first embodiment of the present invention, the port monitor can be used to manage the restriction of the function even if the printer driver that does not support the restriction of printing is used.

Accordingly, the port monitor can be used to manage the restriction of the function even if the printer driver 403 manufactured by a third party or an updated printer driver does not support the restriction of printing.

According to the first embodiment of the present invention, the port monitor 405 can determine whether the printer driver supports the restriction of the function without transmission of information concerning the issuer of the print job (the user of the print client) to the printer by the print client.

Consequently, it is possible to build a system having a convenience higher than that of a system inquiring of the printer about functional information. In addition, since unnecessary inquiry of the SA 103 is not performed because of the presence of Steps S302 and S303, the inquiry can be prevented from being duplicated. For example, it is possible to support a situation in which the version of the printer driver is upgraded to support the restriction of printing but the same port monitor is used.

Second Exemplary Embodiment

According to a second embodiment of the present invention, a method of analyzing the print job data, performed by the port monitor 405, is based on determination of whether the printer driver supports the restriction of printing in Step S303 in FIG. 4.

Specifically, two types of printer drivers, a printer driver A and a printer driver B, are installed in the PC 101.

The port associated with the printer driver A is the same as that associated with the printer driver B and is generated by the port monitor 405. The port serves as a transmission port to the MFP 102.

Detailed settings of the printer driver A, supplied from the port monitor 405, are the similar to those of the printer driver B.

For example, if the communication protocol with the MFP 102 is the LPR, the communication protocol has the following detailed setting information.

(1) Used protocol: LPR
(2) IP address: "172.24.1.20 (IP address of MFP 102)
(3) LPR queue: lp
(4) Use of management function: use
(5) IP address of management server: "172.24.1.20(IP address of SA 103)

A port with the settings (1) to (5), generated by the port monitor 405, is shared between the printer driver A and the printer driver B. The printer driver A has the function of restricting printing while the printer driver B does not have the function of restricting printing.

The provision of multiple printer drivers for the same MFP or printer can be caused in, for example, the case where the MFP 102 has multiple print servers.

Some MFPs in recent years normally have the print server function. Such MFPs tend to be provided with optional print servers having functions and performances higher than those of the standard print servers.

In the above case, since the optional print servers have printer drivers different from those of the standard print servers, there can be cases in which multiple printer drivers are used for a single MFP.

In addition, a single print server can have a function of processing multiple types of the PDL language. Printer drivers ordinarily support a single PDL language. Accordingly, when a single print server supports multiple types of the PDL language, it is necessary to provide printer drivers supporting the respective PDL languages.

According to the second embodiment of the present invention, it is assumed that the MFP 102 has the function of processing two types of the PDL language and the printer drivers A and B respectively support the two types of the PDL language. It is particularly assumed that the printer driver is described in the PostScript (PS) language (registered trademark), which is a BPDL language.

The initial data of the print job generated by the printer driver A is shown in FIG. 10. The initial data of the print job generated by the printer driver B is shown in FIG. 12.

FIG. 12 shows an example of the initial data of the print job generated by the printer driver of the information processing apparatus according to the second embodiment of the present invention.

However, the pieces of data shown in FIGS. 10 and 12 are not generated by the same application or data. When the port monitor 405 receives the print jobs from the printer drivers A and B, the result of the determination in Step S303 differs between the printer drivers A and B.

Figure 13:
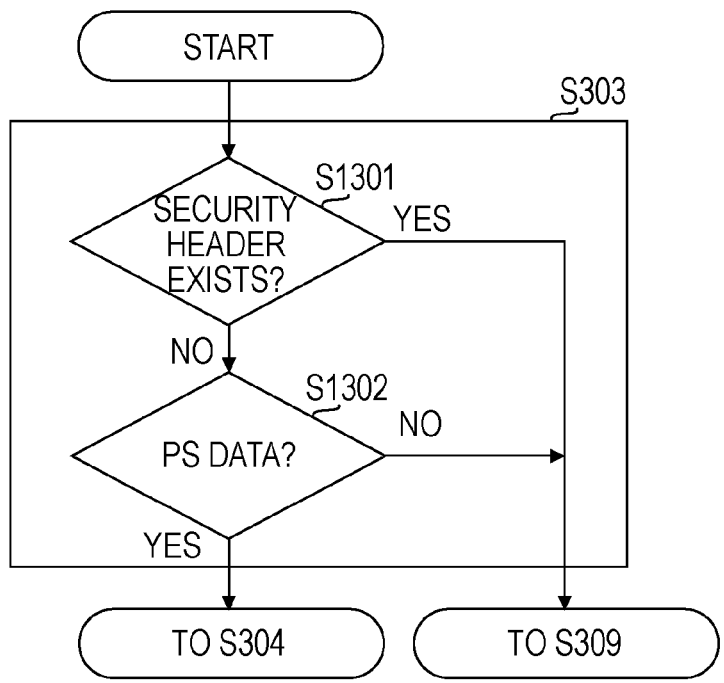
FIG. 13 is a flowchart showing an example of a second data processing process in the information processing apparatus according to the second embodiment of the present invention.

FIG. 13 is a flowchart showing an example of a second data processing process in the information processing apparatus according to the second embodiment of the present invention. The second data processing process indicates another determination process in Step S303 in FIG. 4 in detail.

S1301 and S1302 show steps. It is assumed that the port monitor 405 shown in FIG. 5 is software having the function of transmitting the print data to the MFP 102 or the printer and is installed in the PC 101.

In Step S1301, the port monitor 405 determines whether the security header exists. If the port monitor 405 determines that the security header exists, the port monitor 405 determines that the print job is generated by the printer driver having a function of managing the printing and goes to Step S309.

In contrast, if the port monitor 405 determines that the security header does not exist, the port monitor 405 goes to Step S1302. In Step S1302, the port monitor 405 determines whether the print job is generated by the printer driver having the function of managing the printing on the basis of the type of the PDL data.

Specifically, the port monitor 405 refers to predetermined data in the print job to determine whether the print job is generated by the printer driver having the function of managing the printing on the basis of the presence of a predetermined value.

According to the second embodiment of the present invention, the printer driver B generating the PDL data in the PS language does not have the function of managing the printing. The printer driver A generating the PDL data in another data stream has the function of managing the printing. The determination logic in the port monitor 405 is also programmed in such a manner.

If the print data shown in FIG. 12 includes "% ! PS-Adobe-3.0" at the beginning thereof, the port monitor 405 determines that the print data is described in the PS language. "Adobe" indicates Adobe Systems Incorporated.

Since the print job generated by the printer driver A is not described in the PS language, the port monitor 405 determines in Step S1302 that the print job is generated by the printer driver having the function of managing the printing and goes to Step S309 to transmit the print data to the MFP 102.

In contrast, since the print data generated by the printer driver B includes the PS data, the port monitor 405 determines in Step S1302 that the print job is generated by the printer driver that does not have the function of managing the printing and goes to Step S304 to inquire of the SA 103 about the print right of the PC 101.

Accordingly, even if the multiple printer drivers use the same port, the port monitor 405 can determine whether the printer drivers have the function of managing the printing.

According to the second embodiment of the present invention, it is possible to restrict the printing even in the environment in which the updated printer driver that does not support the restriction of printing or the printer driver and print server manufactured by a third party are used.

The determination of whether the management of the printing is to be performed by the port monitor 405 is not limitedly based on the analysis logic of the print job in the PS language. For example, another data stream may be used as a trigger.

In addition, a mechanism in which data to be subjected to the management of the printing is selected by a user may be adopted.

Third Exemplary Embodiment

In the first and second embodiments of the present invention, it is determined whether the printer driver supports the restriction of printing for all the print jobs to restrict the transmission of the print jobs.

However, according to a third embodiment of the embodiment, the determination of the restriction of printing is performed only for the print jobs based on specified application data, and the restriction of printing is performed by combinations of users and applications. The types of the applications are determined on the basis of the file identifiers of the pieces of the application data.

Fourth Exemplary Embodiment

The warning process is performed and the transmission of the print job data is stopped in Step S310 in FIG. 4 and the print job is deleted in Step S311 in FIG. 4 in the first embodiment of the present invention described above. However, according to a fourth embodiment of the present invention, the port monitor 405 performs the warning process in another manner.

For example, the port monitor 405 may display a message asking whether "printing is stopped" in Step S310. The port monitor 405 may delete the print job data in Step S311 only if the user instructs the stopping of the printing and may output the print job data to the image forming apparatus if the user instructs that the printing is not stopped.

However, the image forming apparatus performs a rounding process for the function exceeding the print right. For example, if suppression of color printing is described in the print right information (FIG. 9), monochrome printing is forcedly performed.

Alternately, the port monitor 405 may display another dialog box and the functional settings of the print job may be automatically corrected so as to meet the determination in Step S308 in the indication in Step S310 in order to improve the convenience for the user.

In the above case, it is possible to prevent any failure of the printing when the image forming apparatus is caused to print the print job exceeding the restriction of printing and to accommodate emergent printing. In addition, since the print job within the restriction of printing can be efficiently transmitted to the image forming apparatus, it is possible to realize the printing process that meets both the request of the user and the restriction of printing.

Fifth Exemplary Embodiment

The configuration of a data processing program that can be read by the information processing apparatus according to a fifth embodiment of the present invention will now be described with reference to a memory map shown in FIG. 14.

Figure 14:
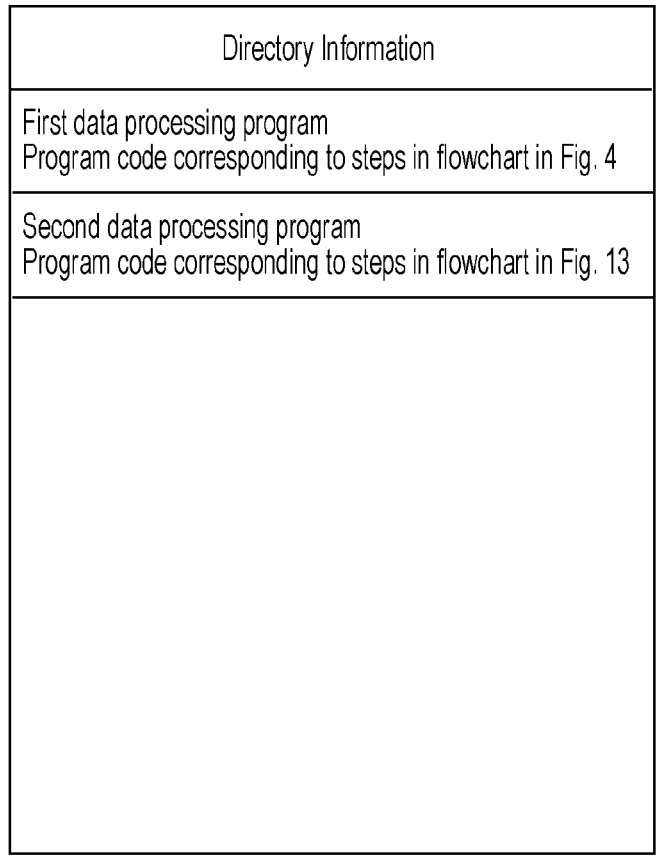
FIG. 14 illustrates an example of the memory map of a storage medium storing various data processing programs that can be read by an information processing apparatus according to a fifth embodiment of the present invention.

FIG. 14 illustrates an example of the memory map of a storage medium storing various data processing programs that can be read by the information processing apparatus according to the fifth embodiment of the present invention.

Although not shown, information used for managing the programs stored in the storage medium, for example, version information and information concerning the creator of the programs, may be stored in the storage medium. In addition, information depending on the OS or the like of a device that reads out the programs, for example, icons used for identifying the programs, may be stored in the storage medium.

Furthermore, data depending on the various programs may be managed in the directory structure. If programs used for installing the various programs in the computer or installed programs are compressed, programs used for uncompressing the above programs may be stored in the storage medium.

The functions shown in FIGS. 4 and 13 according to the embodiments of the present invention may be executed by the host computer by using externally installed programs. In this case, the information group including the programs may be supplied to an output apparatus from a storage medium, such as a CD-ROM or a flash memory, or from an external storage medium over a network.

The present invention can be embodied by supplying a storage medium having the program code of software realizing the functions according to the above embodiments to a system or an apparatus, the computer (or the CPU or the micro processing unit (MPU)) in which system or apparatus reads out and executes the program code stored in the storage medium.

In this case, the present invention is embodied by the program code itself read out from the storage medium. The present invention is applicable to the storage medium storing the program code.

The above program may be an object code, a program executed by an interpreter, or script data supplied to the OS as long as the object code, program, or the script data has the function of the program.

The storage medium supplying the program may be any storage medium, such as a floppy disk, a hard disk, an optical disk, a magneto-optical disc (MO), a CD-ROM, a compact disc recordable (CD-R), a compact disc rewritable (CD-RW), a magnetic tape, a nonvolatile memory cared, a ROM, or a digital versatile disc (DVD).

Alternatively, the program or the compressed file including an automatic installation function may be downloaded from a Web page on the Internet into the recording medium, such as the hard disk, by using the browser of the client computer. Alternatively, the program code in the program according to the embodiments of the present invention may be divided into multiple files that are downloaded from different Web pages. In other words, the present invention is applicable to a WWW server or an ftp server from which multiple users download the program files that realize the functions according to the embodiments of the present invention in the computer.

The program according to the embodiments of the present invention may be encrypted, the encrypted program may be stored in a storage medium, such as a CD-ROM, and the storage medium may be distributed to users. Users meeting predetermined conditions may be allowed to download key information used for decrypting the encryption from a Web page over the Internet. The key information may be used to execute the encrypted program and to install the program in the computer.

The computer that executes the readout program code realizes the functions of the embodiments described above. In addition, the OS or the like running on the computer may execute all or part of the actual processing on the basis of instructions in the program code to realize the functions of the embodiments described above.

In addition, after the program code read out from the storage medium has been written in a memory that is provided in an expansion board included in the computer or in an expansion unit connected to the computer, the CPU or the like in the expansion board or the expansion unit may execute all or part of the actual processing on the basis of the instructions in the program code to realize the functions according to the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-157727 filed Jun. 6, 2006, which is hereby incorporated by reference herein in its entirety.

What is claimed is:

1. A port monitor program embodied on a non-transitory computer readable medium in an information processing apparatus having a printer driver configured to generate data about a print job and a spooler configured to spool the data about the print job, wherein the port monitor program includes computer-executable instructions for having a function of data transmission and data receipt and transmitting the data about the print job spooled by the spooler to an image forming apparatus, the port monitor program comprising:
   computer-executable instructions for reading the data about the print job that is generated by the printer driver and spooled by the spooler;
   computer-executable instructions for analyzing whether the read data about the print job includes information indicating that the printer driver supports restriction of printing and for determining whether an authentication process associated with restriction of printing is already performed for the data about the print job by the printer driver which supports the authentication process associated with the restriction of printing based on the analysis;
   computer-executable instructions for submitting a request to an external server over a network to acquire, from the external server, functional restriction information used for the restriction of printing in response to determining that the authentication process has not already been performed;
   computer-executable instructions for determining, based on the functional restriction information acquired from the external server, how the print job is restricted; and
   computer-executable instructions for transmitting the data about the print job to the image forming apparatus based on a result of determining how the print job is restricted in response to determining that the authentication process has not already been performed and for transmitting the data about the print job to the image forming apparatus without submitting a request in response to determining that the authentication process has already been performed.

2. The port monitor program according to claim 1, wherein the information indicating that the printer driver supports the authentication process associated with the restriction of printing is a header included in the data about the print job, and wherein the header corresponds to the functional restriction information.

3. The port monitor program according to claim 1, wherein determining how the print job is restricted determines a presence of a function that is not allowed to be performed in setting of the print job based on the acquired functional restriction information.

4. The port monitor program according to claim 1, further comprising computer-executable instructions for enabling or disabling the functional restriction function.

5. The port monitor program according to claim 1, further comprising computer-executable instructions for transmitting the data about the print job to the image forming apparatus in response to the setting of the print job meeting a condition described in the acquired functional restriction information and for stopping the transmission of the data about the print job.

6. A data processing method using a port monitor program in an information processing apparatus having a printer driver configured to generate data about a print job, a spooler configured to spool the data about the print job, and a port monitor having a function of data transmission and data receipt and configured to transmit the data about the print job spooled by the spooler to an image forming apparatus, the data processing method comprising:

reading, using the port monitor, the data about the print job that is generated by the printer driver and spooled by the spooler;

analyzing, using the port monitor, whether the read data about the print job includes information indicating that the printer driver supports restriction of printing and determining, using the port monitor, whether an authentication process associated with restriction of printing is already performed for the data about the print job by the printer driver which supports the authentication process associated with the restriction of printing based on the analysis;

submitting, using the port monitor, a request to an external server over a network to acquire, from the external server, functional restriction information used for the restriction of printing in response to determining that the authentication process has not already been performed;

determining, using the port monitor and based on the functional restriction information acquired from the external server, how the print job is restricted; and transmitting, using the port monitor, the data about the print job to the image forming apparatus based on a result of determining how the print job is restricted in response to determining that the authentication process has not already been performed and transmitting, using the port monitor, the data about the print job to the image forming apparatus without submitting a request in response to determining that the authentication process has already been performed.

7. An information processing apparatus comprising:
a printer driver configured to generate data about a print job;
a spooler configured to spool the data about the print job; and
a port monitor having a function of data transmission and data receipt and configured to transmit the data about the print job spooled by the spooler to an image forming apparatus, wherein the port monitor includes:
a reading unit configured to read the data about the print job that is generated by the printer driver and spooled by the spooler,
a first determining unit configured to analyze whether the read data about the print job includes information indicating that the printer driver supports restriction of printing and to determine whether an authentication process associated with restriction of printing is already performed for the data about the print job by the printer driver which supports the authentication process associated with the restriction of printing based on the analysis,
an acquiring unit configured to submit a request to an external server over a network to acquire, from the external server, functional restriction information used for the restriction of printing in response to the first determining unit determining that the authentication process has not already been performed,
a second determining unit configured to determine, based on the functional restriction information acquired from the external server, how the print job is restricted, and
a transmitting unit configured to transmit the data about the print job to the image forming apparatus based on a result of determining how the print job is restricted in response to the first determining unit determining that the authentication process has not already been performed and to transmit the data about the print job to the image forming apparatus without submitting a request by the acquiring unit in response to the first determining unit determining that the authentication process has already been performed.

8. A non-transitory computer-readable storage medium storing a program that causes an information processing apparatus to perform the method according to claim 6.

* * * * *